United States Patent Office 3,489,710
Patented Jan. 13, 1970

3,489,710
FLEXIBLE THERMOPLASTIC RESINS AS BINDERS FOR VULCANIZED RUBBER
Sergio Bonotto, Princeton, and Burton H. Krevsky, New Brunswick, N.J., assignors to Union Carbide Corporation, a corporation of New York
No Drawing. Filed Mar. 4, 1964, Ser. No. 349,479
Int. Cl. C08f 29/10; C08g 11/00
U.S. Cl. 260—33.6                                    13 Claims

ABSTRACT OF THE DISCLOSURE

Interpolymers of ethylene with copolymerizable olefinically unsaturated monomers and post-reacted ethylene homopolymers having tensile strengths above 500 p.s.i., tensile elongations above 200 percent and torsional rigidity between about 2000 and 15,000 p.s.i. are shown to be highly compatible binders for vulcanized rubber scrap and rubber dust.

---

This invention relates to a reconstituted rubber product which is formed by bonding together vulcanized rubber scrap particles and vulcanized rubber dust.

Vulcanized rubber scrap and vulcanized rubber dust are created whenever rubber products, or products utilizing rubber components, are subjected to manufacturing processes. Rubber scrap and rubber dust result from the many trimming, finishing, and polishing operations that are carried on throughout industry. The usual practice in industry is to dispose of this rubber scrap and rubber dust as waste. Hence, hundreds of tons of this scrap material are either burned or discarded each year while only small amounts are incorporated in low quality grade mechanical rubber goods.

Until recently, there has been no way in which this waste material could be used in the versatile manner which this invention discloses so that it would be of economic value and importance. Attempts to employ conventional thermoplastic polymers such as polyethylene as a binder for bonding vulcanized rubber scrap particles have not been successful. The resultant products are unsatisfactory since they are quite rigid, are very low in elongation, and have such low flex-crack resistance as to appear brittle. These deficiencies become even more pronounced when a polyethylene binder is employed in attempting to compound compositions having a high rubber content.

In like manner, vulcanizable rubber formulations, such as a butadiene-styrene rubber, butyl rubber and the like, have been attempted as binders for bonding vulcanized rubber scrap particles. The resulting products are also quite unsatisfactory since they exhibit very low tensile strengths. While vulcanizable rubber binders reinforced with carbon yielded improved products, they still exhibit poor elongation, even at very low modulus and are, therefore, equally unsatisfactory.

It is an object of this invention, therefore, to obtain a reconstituted rubber product wherein particles of vulcanized rubber scrap and vulcanized rubber dust are bonded together through the use of selected, flexible, thermoplastic resins.

It is a further object of this invention to obtain reconstituted rubber products which exhibit significantly improved and superior mechanical properties.

Another object of this invention is to obtain reconstituted rubber products which contain between 40–90% by weight vulcanized rubber scrap and vulcanized rubber dust particles.

These and further objects of this invention will, in part, be obvious and will, in part, be made more clear from the ensuing discussion.

It has recently been discovered that significant quantities of waste vulcanized rubber scrap and vulcanized rubber dust in amounts as high as 80%–90% by weight can now be bonded together and a product obtained which exhibits surprisingly superior properties than has been heretofore attainable.

Thus, it is now possible to obtain reconstituted rubber products which exhibit such superior properties as greater tensile strength, a higher percentage of elongation, significantly more flexibility and noticeably improved flex-crack resistance than has been heretofore attainable.

The reconstituted rubber products having these superior properties are obtained through the use of specific, flexible, thermoplastic resins acting as the bonding agents.

Further, it has also been found that, through the use of these selective resins acting as bonding agents, a significantly greater amount of vulcanized rubber scrap particles and vulcanized rubber dust particles may be bonded together than has been heretofore realizable. Formerly, it has only been possible to obtain a product comprised of between about 10–30% by weight rubber scrap and rubber dust particles. Now, however, by employing the selected, flexible, thermoplastic resins as discussed hereinbelow, it is possible to obtain desirable and functional products which contain as much as 90%, or more, by weight vulcanized rubber scrap and vulcanized rubber dust particles for use as shoe soles, heels and other similar uses.

By the term, "reconstituted rubber" is meant that product which is formed from the practice of this invention and is the result of bonding together vulcanized rubber scrap particles and vulcanized rubber dust with selected thermoplastic resins. Hence, all reference throughout this application to the term "reconstituted rubber" will be understood to mean and refer to the definition just stated.

The bonding agents that are used as binders in the practice of this invention are selected from the group of resins generally designated as flexible ethylene polymers. This group of polymers is relatively new, having only recently become commercially available within the past 3–4 years. This group includes such polymers as ethylene interpolymers with, for example, copolymerizable olefinically unsaturated monomers as acrylic acid, alkyl acrylates, vinyl acetate, propylene, butene, bicycloheptene, methyl ethyl vinyl acetamide and so forth, as well as post-reacted ethylene homopolymers; for example, those which are chlorinated, chlorosulfonated, and so forth, in order that elastomeric properties may be imparted to the ethylene-based polymers.

Terpolymers have also been found to be efficient binders; particularly those which contain reactive groups in their molecular structure such as the carboxyl and hydroxyl groups, or residual unsaturation, as in the ethylene-propylene-diene terpolymers.

More particularly, the flexible binders employed in the practice of this invention are those which exhibit specific mechanical properties; that is, wherein the polymer, without vulcanization has a tensile strength of more than 500 p.s.i., a tensile elongation of more than 200 percent, and a torsional rigidity of more than 2000 p.s.i. Preferably, the thermoplastic polymers should exhibit mechanical properties wherein tensile strength is more than 1000 p.s.i., tensile elongation is greater than 500 percent and the torsional rigidity is higher than 2000 p.s.i. but less than 15,000 p.s.i.

It will be readily apparent to those skilled in the art that the various groups of polymers, described hereinabove, which may be used as binders contain completely different chemical properties. Nevertheless, the correct flexible, thermoplastic polymer can be selected from these chemically dissimilar polymers to form the reconstituted rubber products of the instant invention when the thermoplastic polymers described hereinabove exhibit mechanical properties of tensile strength greater than 500 p.s.i., tensile elongation of more than 200 percent and torsional rigidity of at least 2000 p.s.i. but less than 15,000 p.s.i.

The vulcanized rubber scrap and vulcanized rubber dust utilized in the practice of this invention is obtained from the scrap of various product manufacturing processes; such as, automobile tires, heels for shoes, weather proofing strips, and so forth. This type of rubber scrap is usually flexible and non-flowing. Generally, the composition of this rubber scrap includes such ingredients as clay fillers, carbon black, silicas, modifiers, extenders, and so forth. Typically, the formulations of these rubber products include not only the various grades of natural rubber, but also synthetic rubbery polymers, as is exemplified by styrene-butadiene copolymer rubbers and related butadiene polymers; such as, polybutadiene, polychloroprene, polyisobutylene, polyisoprene, and the nitrile polymers; such as acrylonitrilebutadiene copolymers, the acrylonitrile-styrene-butadiene terpolymers and like materials, the olefin rubbers; such as, the ethylene-propylene copolymers and ethylene-propylene-diene terpolymers and like rubbery polymers that have been vulcanized by agents to yield tough, elastomeric, thermally stable vulcanized rubber products whether they are vulcanized with sulfur or sulfur-containing vulcanization agents; or other agents such as organic peroxides, isocyanates, metal oxides, or other cross-linking agents, or with mixtures of several such cross-linking vulcanization agents. In short, all the various vulcanized or cross-linked rubber formulations and compositions commonly known to and used by those skilled in the industry can be employed in this invention.

Hence, while a wide variety of vulcanized rubber scrap and vulcanized rubber dust may be used, that which is obtained as waste from the manufacture of rubber tires and rubber heels for shoes is preferred and is most readily available in large quantities.

Depending upon the nature and type of end product desired, the amount of finely divided rubber scrap particles to be formulated with the thermoplastic polymer may vary between about 20:1 to 0.5:1 parts by weight of rubber to polymer, respectively, and, preferably, between about 10:1 to 1:1 parts by weight of rubber to polymer, respectively.

Generally, an increase in the amount of polymer incorporated will result in end products which have smoother surfaces and greater flexibility. Conversely, incorporation of greater amounts of vulcanized rubber particles will result in stiffer end products having less flexibility and rougher surfaces.

The flexible thermoplastic polymers, or compositions, selected for use as bonding agents may also be cross-linked through the utilization of proper cross-linking agents. When interpolymers are used, for example, peroxidic-type cross-linking agents, such as dicumyl peroxide, benzoyl peroxide, and so forth, are extremely useful. Usually a cross-linking agent of the peroxide type is incorporated into the mix at temperatures below which the peroxide radical will decompose.

Where polymers containing reactive sites, such as residual unsaturation, hydroxyl or carboxyl groups, are selected for use as bonding agents, then suitable cross-linking agents may be used such as sulfur, isocyanates and so forth. These binders may be preferred particularly where the inherent odor resulting from the use of peroxide cross-linking agents is offensive.

The cross-linking agents discussed hereinabove are representative of those commonly used in industry to obtain cross-linking and are well known to those skilled in the art.

It may also be desirable to produce a product which has greater flexibility, particularly where the bonding agents are to be cross-linked. Greater flexibility may be obtained by incorporating suitable plasticizers into the composition. Among the plasticizers which may be used to attain greater flexibility are those which fall into the general class of mineral extender oils. Typical of the mineral extender oils which may be employed and which are commercially available, are the highly aromatic extender oils containing about 30 percent aromatic carbons and having a viscosity of 93 SSU at 210° F. In like manner, typical naphthenic extender oils containing about 42 percent naphthenic carbons and having a viscosity of 40 SSU at 210° F. may also be used. In addition to these, plasticizers such as dioctyl phthalate may also be used. These plasticizers are representative of those generally employed in the plastics industry and their application is well known to those skilled in the art.

Whenever plasticizers are used, they may be incorporated into the composition in amounts of, depending upon the compatibility of the plasticizer, preferably up to about 5 percent by weight. This amount appears to be optimum. When employed in the instant invention the amount of plasticizer incorporated was calculated from the total weight of the mixture consisting of the vulcanized rubber scrap particles and the flexible thermoplastic polymer.

Generally, the reconstituted rubber products of the instant invention may be manufactured by a typical processing method such as is outlined below:

(1) Vulcanized rubber scrap and vulcanized rubber dust are ground to particle size of between about 20 and 150 mesh.

(2) To these particles is added a specifically selected, flexible thermoplastic polymer.

(3) This composition is then milled in a standard milling machine, such as a Banbury mill.

(4) The resulting composition may then be molded, extruded, calendered and so forth to form the final reconsituted rubber product desired.

If the polymer or composition is to be cross-linked, a suitable cross-linking agent is usually added before step (2).

Where plasticizers are desired, they may be added before the mixture is milled.

In forming an end product from the reconstituted rubber, various processes may be utilized depending upon the nature and type of product desired. For example, the reconstituted rubber formed may be calendered, extruded, compression molded, injection molded, sintered and fused, mold casted, foamed and so forth in accordance with methods well known in the art.

Whenever a calendering process is used, it may be desirable to use releasing agents, such as, zinc stearate, in order to facilitate removal of the composition from the calendering rolls.

Compounding the vulcanized rubber scrap may be achieved through typical processes whereby the scrap rubber is formed into powders, granules or particles of varying size and shape and so forth.

It should be understood that products containing different surface compositions and textural appearances may also be obtained where desired by using particles of relatively larger size than the 20–150 mesh size indicated above. Use of larger particles would be of particular interest where the end particles is to be decorative as well as functional. For example, in the manufacture of floor tiles and ceiling and wall panelings, larger particles of vulcanized rubber scrap may be utilized to create a decorative effect in these functional products. Such products are readily obtainable by placing relatively large particles of vulcanized rubber scrap in the order of about 1/16" to 1/8" in thickness, 1/4" to 5/8" in width, and 1/2" to 2 1/2" in length in the Banbury, milling at elevated temperatures and then adding to the partially ground batch the specifically selected thermoplastic polymer. The size of these relatively large particles of vulcanized rubber scrap may be varied so that there is created in the final product the effect of chips, nuggets, and so forth.

When such larger particles are used, the final product will tend to have a more heterogeneous appearance as opposed to the homogeneous effect created by incorporating particle sizes of 20–150 mesh. However, it should also be understood that larger particles, such as those described immediately above, may be blended with smaller particles of 20–150 mesh to create a still further decorative effect. In like manner, these particles may also vary in color when such an effect is desired.

It is readily apparent, therefore, that a wide variety of reconstituted rubber products may be obtained by utilizing standard equipment and process methods. Among the many products that may be obtained are such items as rug backings for non-skid rugs or mats, trunk linings for automobiles, floor mats, roofing, weather stripping, sealing gaskets, inner linings for shoes, shoe soles, shoe heels, decorative wall or ceiling absorbing panels, toys, electrical insulation, blow-molded bottles, injection moldings, coatings, laminates and so forth.

By way of illustration, the following examples are set forth as being merely exemplary and not limitative, of the manner in which vulcanized rubber scrap particles and vulcanized rubber dust particles may be bonded with a selected thermoplastic polymer to form the new reconstituted rubber product of this invention. All percentages are in parts by weight.

EXAMPLE I 80 grams of vulcanized rubber scrap and vulcanized rubber dust, having a particle size of about 35 mesh, were milled with 20 grams of an ethylene-ethyl acrylate copolymer, containing about 15 percent combined ethyl acrylate and having a melt index of 6.0, on a two roll rubber mill at 105° C. for 4 minutes. The resultant compound was compression molded at 120° C. under a pressure of 200 p.s.i. to yield a reconstituted rubber plaque measuring 6" x 6" x 0.5". The plaque was subjected to standard tests to measure tensile strength, flexibility and percent elongation. The test methods used to measure tensile strength and percent elongation were conducted according to ASTM-D-638-58T. The test method used to measure flexibility was conducted according to ASTM-D-747-58T.

The plaque was also tested to measure flex life. This test was conducted according to the Ross Rubber Flex Test method. The Ross Rubber Flex Life Test employs a specimen measuring 1" x 7" having a thickness of 125 mils. The specimen is bent through a 90° arc at a rate of 100 times per minute. When desired, a slit measuring 100 mils in width may be cut in the specimen to obtain a controlled flaw. When no slit is employed, the results are reported as the number of cycles required to obtain initial cracking or total failure. When the controlled flaw is used, the results are reported as the increase in length of the slit after the specimen is subjected to a given number of cycles (Carey, R. H., ASTM Bulletin No. 206, 1955).

The results obtained from these tests were compared to the mechanical properties of same copolymer per se; that is, the non-vulcanized ethylene-ethyl acrylate copolymer. These results are tabulated in Table I wherein the copolymer properties are listed as "control."

Table I also lists, in a similar manner, the test results for the products obtained in Examples II–VI which follow. The term "control" is intended to apply, in each instance, to the mechanical properties of the corresponding non-vulcanized copolymer per se employed in each of the aforementioned examples as illustrated and defined in Example I above.

EXAMPLE II

The same procedure was followed as in Example I except that a polyethylene having a density of 0.92 and a melt index of 1.5 was used in place of the ethylene-ethyl acrylate copolymer. The "control" listed under Example II in Table I is, therefore, the above-identified non-vulcanized polyethylene.

Referring to Table I, it is apparent that the plaque obtained when the polyethylene of Example II was used has a significantly lower percentage of elongation and a much higher stiffness modulus than the plaque obtained from Example I. Further, the initial tear strength and final failure, as determined by the Ross Rubber Flex Test, occur after noticeably fewer cycles.

These differences in performance and mechanical properties of the plaques obtained are equally apparent when compared to the test results of the other examples, as listed in Table I.

EXAMPLE III

The same procedure was followed as in Example I, except that an ethylene-propylene copolymer, containing 36 percent of combined propylene and having a melt index of 0.1, was used in place of the ethylene-ethyl acrylate copolymer. The "control" is the above-identified non-vulcanized ethylene-propylene copolymer.

EXAMPLE IV

The same procedure was followed as in Example I, except that an ethylene-bicycloheptene, containing 17 percent combined bicycloheptene and having a melt index of 7.5, was used in place of the ethylene-ethyl acrylate copolymer. The "control" is the above-identified non-vulcanized ethylenebicycloheptene copolymer.

EXAMPLE V

The same procedure was followed as in Example I, except that an ethylene-vinyl acetate copolymer containing 27 percent combined vinyl acetate and having a melt index of 350, was used in place of the ethylene-ethyl acrylate copolymer. The "control" is the above-identified non-vulcanized ethylene-vinyl acetate copolymer.

EXAMPLE VI

The same procedure was followed as in Example I, except that a chlorinated polyethylene copolymer was used in place of the ethylene-ethyl acrylate copolymer, which contained 20 percent chlorine and had a density of 0.92, a melt index of 2.0, and which was stabilized with 3.0 percent of a dibasic lead phosphite having the general formula $2PbO \cdot PbHPO_3 \cdot 1\text{-}2H_2O$. The "control" is the above-identified non-vulcanized chlorinated polyethylene copolymer.

Examples I–VI above serve to illustrate that use of a selected thermoplastic polymer whose mechanical properties exhibit a tensile strength in excess of 1000 p.s.i., a tensile elongation of over 500 percent and a torsional rigidity of between about 2,000 and 15,000 p.s.i. will yield excellent reconstituted rubber products securing product properties such as those listed in Table I.

TABLE I

| | Example I | | Example II | | Example III | | Example IV | | Example V | | Example VI | |
|---|---|---|---|---|---|---|---|---|---|---|---|---|
| | Control | Plaque | Control | Plaque | Control | Plaque | Control | Plaque | Control | Plaque | Control | Plaque |
| Tensile Strength, p.s.i. | 1,400 | 750 | 1,800 | 800 | 700 | 400 | 2,000 | 800 | 1,100 | 650 | 1,160 | 585 |
| Percent Elongation | 700 | 130 | 600 | 40 | 560 | 200 | 700 | 90 | 280 | 100 | 765 | 60 |
| Flexural Stiffness at 23° C., p.s.i. | 5,000 | 5,100 | 18,000 | 9,000 | 2,200 | 4,000 | 9,200 | 5,000 | 3,000 | 3,900 | 3,500 | 3,520 |
| Ross Rubber Flex Life, cycles: | | | | | | | | | | | | |
| Initial Tear | 20,000 | 9,000 | 450 | 25 | (*) | 100 | (*) | 250 | (*) | (*) | 500,000+ | 415 |
| Final Failure | >500,000 | 70,000 | 30,000 | 900 | (*) | 7,000 | (*) | 3,500 | (*) | (*) | 500,000+ | 7,000 |

*Not measured.

In order to further illustrate the use of ethylene polymers and modified ethylene copolymers as binders in the instant invention, two different plasticized vinyls were selected and used as binders. One plasticized vinyl was selected which had a flexural stiffness nearly equivalent to the ethylene-ethyl acrylate copolymer while the other plasticized vinyl had a flexural stiffness substantially lower than the ethylene-ethyl acrylate copolymer. The products obtained from using the plasticized vinyls were also compared with vulcanized rubber products wherein styrene butadiene and butyl rubber formulations were employed. The manner in which these products were obtained is set forth in Examples VII–XI below. The results obtained from subjecting the products of Examples VII–XI to the same tests as were conducted for Examples I–VI above are set forth in Table II.

EXAMPLE X

The same procedure was followed as in Example VII except that 20 parts of a vulcanizable butadiene-styrene rubber was used in place of the plasticized polyvinyl chloride of Example VII. The butadiene-styrene rubber formulation was comprised of 1500 parts of butadiene-styrene rubber, containing 23.5% combined styrene and 76.5% butadiene, 750 parts of carbon black, 2.0 parts sulfur, 1.25 parts of a benzothiazyl disulfide cumate and 0.25 part of a synthetic resin mixture of polymerized coumarone, indene and homologous compounds. The butadiene-styrene rubber composition cured in 20 minutes at 310° F.

The results obtained are set forth under Example X of Table II.

TABLE II

| | Example VII | | Example VIII | | Example IX | Example X | Example XI | |
|---|---|---|---|---|---|---|---|---|
| | Control | Product | Control | Product | Product | Product | Product | Control |
| Tensile Strength, p.s.i. | 3,300 | (1) | 2,200 | 600 | (2) | 750 | 370 | 130 |
| Percent of Elongation | 210 | (1) | 260 | 15 | (2) | 65 | 95 | 140 |
| Flexural Stiffness, p.s.i. | 4,200 | (1) | 910 | 7,300 | (2) | 1,910 | 1,370 | 156 |
| Flex Life, Ross Rubber Method, cycles: | | | | | | | | |
| Initial Tear | (3) | (1) | (3) | 20 | (2) | 232 | 16,000 | (3) |
| Final Failure | (3) | (1) | 500,000 | 2,000 | (2) | 250,000 | 200,000 | (3) |

1 Too brittle and weak to test.
2 Not capable of testing; product was too weak and deformed easily.
3 Not measured.

EXAMPLE VII 20 parts of a plasticized polyvinyl chloride having a flexural stiffness equivalent to the acrylate copolymer of Example I above was compounded with 80 parts of vulcanized rubber dust having a particle size of about 35 mesh. The process employed was the same as that which is set forth in Example I above. The polyvinyl chloride was comprised of 71.8 parts of a polymerized suspension of polyvinyl chloride, 26.6 parts of dioctyl phthalate, 0.7 part of a liquid barium-cadmium stabilizer, 0.4 part of an organic phosphite stabilizer, 0.8 part of a liquid epoxy stabilizer and 0.3 part stearic acid.

The resulting product was subjected to the same tests employed for the products of Examples I–VI above. In like manner, the mechanical properties of the above-identified plasticized polyvinyl chloride per se were taken as a measuring control. The results obtained are set forth in Table II below wherein "control" is intended to identify the plasticized polyvinyl chloride per se.

EXAMPLE VIII

The same procedure was followed as in Example VII except that 20 parts of a plasticized polyvinyl chloride having a lower flexural stiffness than the acrylate copolymer of Example I above was used instead of the plasticized polyvinyl chloride of Example VIII. This plasticized vinyl was comprised of 62.9 parts of a polymerized suspension of a polyvinyl chloride, 35.0 parts of dioctyl phthalate, 0.6 part of a liquid barium-cadmium stabilizer, 0.4 part of an organic phosphite stabilizer, 0.8 part of a liquid epoxy stabilizer and 0.3 part stearic acid.

The "control" listed under Example VIII of Table II is, therefore, the above-identified plasticized polyvinyl chloride.

EXAMPLE IX

The same procedure was followed as in Example VII except that 20 parts of a vulcanizable butyl rubber was used in place of the plasticized polyvinyl chloride of Example VII. The butyl rubber formulation was comprised of 1500 parts polyisobutylene rubber modified with about 290 isoprene, 750 parts of carbon black, 75 parts zinc oxide, 15 parts stearic acid, 75 parts of a chlorosulfonated polyethylene synthetic rubber, containing about 29% chlorine and 1.2% sulfur, 3.0 parts sulfur and 1.0 part methyl. The butyl rubber composition cured in 15 minutes at 175° C.

EXAMPLE XI

The same procedure was followed as in Example VII except that a vulcanizable butadiene-styrene rubber, not reinforced with carbon black, was used in place of the plasticized polyvinyl chloride of Example VII. This butadiene-styrene rubber formulation was comprised of 100 parts of a butadiene-styrene rubber containing 23.5% combined styrene and 76.5% butadiene, 2.5 parts sulfur, 1.25 parts of a benzo-thiazyl disulfide cumate and 0.25 part of a synthetic resin mixture of polymerized coumarone, indene and homologous compounds. This composition cured in 20 minutes at 310° F.

A comparison of the results listed in Tables I and II reveals that ethylene polymers and modified ethylene copolymers having lower crystallinity can be employed as effective binders for vulcanized rubber scrap particles and vulcanized rubber dust particles.

It can be seen that mechanically, the ethylene polymer and its modified copolymers display similar qualitative performances with the exception of the polyethylene having a flexural stiffness of 18,000 (Table I, Example II) which yielded products which were found to be significantly more rigid and were prone to cracking upon flexing. This precludes their use for obtaining the flexible products which are obtainable when copolymers having a lower flexural stiffness are employed.

On the other hand, if the copolymers have a flexural stiffness which is too low, they become weak and begin to display the low tensile properties of the non-reinforced vulcanized rubber compositions. For example, compare Example III of Table I with Example XI of Table II. Furthermore, the type of substituent in the ethylene polymer does not appear to be as important as the mechanical properties that result from the introduction of a comonomer unit. Hence, excellent results are obtainable when the selected thermoplastic polymer used as the binder has the optimum mechanical properties of tensile strength of more than 500 p.s.i., a tensile elongation of over 200%, and a torsional rigidity of at least 2000 p.s.i., but less than 15,000 p.s.i.

It follows, therefore, that a large number of modified ethylene polymers can be utilized as binders in this invention and perform substantially as well as the flexible ethylene polymers employed herein.

With regard to the plasticized polyvinyl chloride compositions, it was found (from Tables I and II) that those having a flexural stiffness similar to the acrylate copolymer yielded products which crumbled (Table II, Example VII). On the other hand, the plasticized polyvinyl chloride containing a higher plasticizer content (Table II, Example VIII) yielded products having low elongation and poor flex-crack resistance. Furthermore, this composition became highly brittle when heat-aged in an oven at 80° C. for 15 days, while those compositions wherein the acrylate copolymer was used remained unchanged when subjected to the same heat-aging test.

When compared to plasticized polyvinyl chlorides for use as binders, the selected thermoplastic resins which display the optimum mechanical properties set forth hereinabove are distinctly advantageous in that they reveal no plasticizer migration or embrittlement when aged at elevated temperatures; they display significantly better flex-crack resistance; and they have a higher percentage of elongation and toughness at equivalent flexibility levels.

When compared to the vulcanized rubber compositions (Table II, Examples IX–XI), these selected thermoplastic resins were easier to process since there was no rubber stock to be broken down beforehand and no vulcanization was required with its accompanying drawbacks of scorching and long cure cycles. In addition, they displayed better tensile strength than the vulcanized rubber compositions which were not reinforced with carbon black and a higher percentage of elongation than the carbon black reinforced vulcanized rubber compositions.

As was stated hereinabove, selected thermoplastic crosslinkable copolymers may also be used as bonding agents in obtaining the reconstituted rubber product of this invention. In order to establish that cross-linking actually takes place, a standard control was compounded which is set forth and illustrated by Example XII below. All percentages and parts are by weight.

EXAMPLE XII

To 636 parts of an ethylene-ethyl acrylate copolymer, containing 15 percent combined ethyl acrylate and having a melt index of 6.0, were added 10 parts of dicumyl peroxide, which acted as the cross-linking agent. The ingredients were charged to a Banbury mill which was at a temperature of 120° C. To this composition was added 2542 parts of vulcanized rubber scrap particles and rubber dust particles having a mesh size of 40. The entire batch fluxed at 100° C. and dropped at 110° C. The total cycle time was 5.5 minutes. The compound was then milled on a 2-roll rubber mill for 4 minutes and the resulting sheeted stock was compression molded under 200 p.s.i. at 160° C. for 4, 8 and 15 minute curecycles. The reconstituted vulcanized rubber plaque was readily removed while still hot without pre-cooling the mold.

The resulting product was tested in the same manner as the preceding products. Similar tests were conducted with the products obtained under Examples I and X hereinabove. These results are set forth in Table III.

It will be readily apparent to those skilled in the art that removal of the hot plaque without first cooling the mold substantiates that cross-linking did, in fact, occur since this ability to remove the hot plaque from a hot mold is characteristic of a vulcanized rubber product. If crosslinking had not taken place, the plaque would have had a hot, tar-like consistency and would not have retained its molded shape.

Additional examples illustrating the use of other selected thermoplastic cross-linkable copolymers are set forth below. As in all the preceding examples, the following examples are intended as merely being exemplary and are not to be construed as limitative. All percentages and parts are by weight.

EXAMPLE XIII

To 60 parts of vulcanized rubber scrap particles and vulcanized rubber dust particles having a mesh size of 50 was added 3 parts of dicumyl peroxide acting as the crosslinking agent. This mixture was then milled with 40 parts of an ethylene-ethyl acrylate copolymer, containing 15 percent combined ethyl acrylate and having a melt index of 6.0, for 3½ minutes on a 2-roll rubber mill at 120° C. The resulting compound was compression molded under 200 p.s.i. at 175° C. for 15 minutes. The properties and results of tests are set forth in Table IV.

EXAMPLE XIV

The same procedure was followed as in Example XIII except that a polyethylene having a density of 0.92 and a melt index of 1.5 was used instead of the ethylene-ethyl acrylate copolymer. Test results and properties are listed in Table IV.

EXAMPLE XV

The same procedure was followed as in Example XIII except that a chlorinated polyethylene copolymer having a melt index of 2.0 and a density of 0.92 and which was chlorinated to contain 20% chlorine was used instead of the ethlyene-ethyl acrylate copolymer. Test results and properties are listed in Table IV.

EXAMPLE XVI

The same procedure was followed as in Example XIII except that a semi-rigid chlorinated polyethylene having a melt index of 0.4 and a density of 0.96 and which was chlorinated to contain 20% chlorine was used instead of the ethylene-ethyl acrylate copolymer. Test results and properties are listed in Table IV.

TABLE IV

| | Example XII | Example XIII | Example XIV | Example XV | Example XVI |
|---|---|---|---|---|---|
| Tensile Strength | 800 | 1,000 | 1,150 | 900 | 1,600 |
| Percent Elongation | 105 | 176 | 80 | 135 | 80 |
| Tensile Strength at 100% Elongation | 150 | 1,000 | Failed | 725 | Failed |
| Ross Rubber Flex Life, Cycle Range of Initial Failures | 18,000–20,000 | 600,000–950,000 | 180,000–250,000 | 1,000,000–1,600,000 | 60,000–73,000 |

It will be noted that when thermoplastic copolymer binders were employed and were cross-linked, the strength of the resulting product was materially enhanced. Furthermore, the cross-linked products display properties of improved flex-life, may be removed while still hot from a hot mold similar to vulcanized rubber and involve relatively short cure cycles. When compared to the vulcanized rubber compositions (Table II, Examples IX–XI),

TABLE III

| | Example XII Cured at 160° C.; Pulled Hot After— | | | Example X 20 min. at 154° C. | Example I 3 min. at 150° C.; Pulled cold; cycle time, 8 min. |
|---|---|---|---|---|---|
| Cure | 4 min. | 8 min. | 15 min. | | |
| Tensile Strength | 660 | 775 | 775 | 750 | 725 |
| Percent Elongation | 125 | 125 | 110 | 60 | 190 |
| Flexural Stiffness at 23° C | 3,640 | 3,860 | 4,360 | 1,910 | 3,640 |
| Ross Rubber Flex Life, Slitted Length of crack after 25,000 flexes (100 mils/slit), mils | 160 | 130 | 225 | 100 | [1] 1,000 |

[1] Complete failure.

they exhibit a higher degree of elongation with greater rigidity. Even where a low density polyethylene was cross-linked (Example XIV), the resulting product was inferior to that obtained when a thermoplastic copolymer was cross-linked since the low density polyethylene product displayed a lower percentage of elongation and significantly poorer flex-crack resistance. In general, a product closely resembling regular vulcanized rubber is readily obtainable when employing the selected copolymers having the aforementioned optimum mechanical properties than when other compounds are employed, as has been illustrated hereinabove.

While this invention has been described in detail and with particularity, it should be understood that changes and modifications may be made in the methods, processes, and compositions described herein without departing from the scope and spirit of the invention as contained in the appended claims.

What is claimed is:

1. A reconstituted rubber product which comprises vulcanized rubber scrap particles and vulcanized rubber dust bonded together by an ethylene polymer selected from the group consisting of interpolymers of ethylene and copolymerizable olefinically unsaturated monomers, elastomeric, chlorinated post-reacted ethylene homopolymers and elastomeric, chlorosulfonated post-reacted ethylene homopolymers, said ethylene polymer having a tensile strength of more than 500 p.s.i., a tensile elongation of more than 200 percent, and a torsional rigidity of between about 2000 p.s.i. and 15,000 p.s.i.

2. The reconstituted rubber product of claim 1 wherein the vulcanized rubber scrap particles and vulcanized rubber dust particles are present in ratios of between about 20:1 to 0.5:1 parts of vulcanized rubber dust particles and vulcanized rubber scrap particles to the ethylene-polymer, respectively.

3. A reconstituted rubber product which comprises vulcanized rubber scrap particles and vulcanized rubber dust having a particle size of between about 20–150 mesh bonded together by an ethylene polymer selected from the group consisting of interpolymers of ethylene and co-polymerizable olefinically unsaturated monomers, elastomeric, chlorinated post-reacted ethylene homopolymers and elastomeric, chlorosulfonated post-reacted ethylene homopolymers, said ethylene polymer having a tensile strength of more than 500 p.s.i., a tensile elongation of more than 20–150 mesh bonded together with a selected ethylene polymer whose mechanical properties exhibit a tensile strength of more than 500 p.s.i., a tensile elongation of more than 200 percent, and a torsional rigidity of between about 2000 p.s.i. and 15,000 p.s.i. and a cross-linking agent for said ethylene polymer.

4. The reconstituted rubber product of claim 3 wherein the cross-linking agent is a peroxide.

5. The reconstituted rubber product of claim 3 wherein the cross-linking agent is sulfur.

6. The reconstituted rubber product of claim 3 wherein the cross-linking agent is an isocyanate.

7. A reconstituted rubber product which comprises vulcanized rubber scrap particles and vulcanized rubber dust having a particle size of between about 20–150 mesh bonded together by an ethylene polymer selected from the group consisting of interpolymers of ethylene and co-polymerizable olefinically unsaturated monomers, elastomeric, chlorinated post-reacted ethylene homopolymers and elastomeric, chlorosulfonated post-reacted ethylene homopolymers, said ethylene polymer having a tensile strength of more than 500 p.s.i., a tensile elongation of more than 200 percent, and a torsional rigidity of between about 2000 p.s.i. and 15,000 p.s.i., and a plasticizer.

8. The reconstituted rubber product of claim 7 wherein the plasticizer is selected from the group of plasticizers which are highly aromatic mineral extender oils.

9. The reconstituted rubber product of claim 7 wherein the plasticizer is selected from the group of plasticizers which are naphthenic mineral extender oils.

10. A reconstituted rubber product which comprises:
   (1) vulcanized rubber scrap particles and vulcanized rubber dust having a particle size of between about 20–150 mesh;
   (2) an ethylene polymer selected from the group consisting of interpolymers of ethylene and copolymerizable olefinically unsaturated monomers, elastomeric, chlorinated post-reacted ethylene homopolymers and elastomeric, chlorosulfonated post-reacted ethylene homopolymers, said ethylene polymer having a tensile strength of more than 500 p.s.i., a tensile elongation of more than 200 percent, and a torsional rigidity of between about 2000 p.s.i. and 15,000 p.s.i.;
   (3) a cross-linking agent for said ethylene polymer; and
   (4) a plasticizer.

11. The reconstituted rubber product of claim 10 wherein the vulcanized rubber scrap particles and vulcanized rubber dust particles are present in ratios of between about 20:1 to 0.5:1 parts of vulcanized rubber dust particles and vulcanized rubber scrap particles to the ethylene polymer, respectively.

12. A reconstituted rubber product which comprises:
   (1) vulcanized rubber scrap whose particles have a thickness of between about $\frac{1}{16}''$ to $\frac{1}{8}''$, a width of between about $\frac{1}{4}''$ to $\frac{5}{8}''$, and a length of between about $\frac{1}{2}''$ to $2\frac{1}{2}''$ prior to milling;
   (2) an ethylene polymer selected from the group consisting of interpolymers of ethylene and copolymerizable olefinically unsaturated monomers, elastomeric, chlorinated post-reacted ethylene homopolymers and elastomeric, chlorosulfonated post-reacted ethylene homopolymers, said ethylene polymer having a tensile strength of more than 500 p.s.i., a tensile elongation of more than 200 percent, and a torsional rigidity of between about 2000 p.s.i. and 15,000 p.s.i.
   (3) a cross-linking agent for said ethylene polymer; and
   (4) a plasticizer.

13. The reconstituted rubber product of claim 12 wherein the vulcanized rubber scrap includes vulcanized rubber dust particles having a particle size of between 20–150 mesh.

References Cited

UNITED STATES PATENTS

| | | | |
|---|---|---|---|
| 3,406,127 | 10/1968 | Alexander | 260—4 |
| 2,653,914 | 9/1953 | Elgin et al. | 260—2.3 |
| 3,057,390 | 10/1962 | Pattison | 260—2.3 |

MORRIS LIEBMAN, Primary Examiner

R. BARON, Assistant Examiner

U.S. Cl. X.R.

260—2.3, 4, 41, 719, 889